INVENTOR
ARTHUR E. ADAMS

BY                    ATTORNEY

No. 3,492,911
RELEASE WIRE RESTRAINING MEANS FOR AIR-DROPPED DEVICES EQUIPPED WITH SPEED BRAKES
Arthur E. Adams, Upper Marlboro, Md., assignor to the United States of America as represented by the Secretary of the Navy
Filed Apr. 29, 1968, Ser. No. 724,938
Int. Cl. F42b 25/02
U.S. Cl. 89—1.5                                   4 Claims

ABSTRACT OF THE DISCLOSURE

This invention is directed to a wire restraining means to be used with air-dropped devices that are equipped with speed brakes and are releasably attached to an airplane. The restraining means includes a tube and restraining clips. The tube is mounted on the air-dropped device and the release wire from the airplane which controls the speed brake is reeved through the tube. The restraining clips are attached to the release wire at the rear of the tube.

GOVERNMENT INTEREST IN THE INVENTION

The invention defined herein may be manufactured and used by or for the Government of the United States of America for governmental purposes without the payment of any royalties thereon or therefor.

BACKGROUND OF THE INVENTION

Field of the invention

The invention relates to a wire restraining means for use with air-dropped devices which are equipped with speed brakes. These devices are releasably attached to the outside of the airplane and the deployment of the speed brake is controlled by a release wire connected to the plane. The invention serves to decrease the vibrations in the release wire and to prevent improper deployment of the speed brake.

Description of the prior art

The air-dropped devices contemplated in this invention are attached by lugs to release racks mounted on the wings of an airplane. The lugs are held in place by a solenoid and the air-dropped devices are released when the solenoid is energized.

The speed brake is controlled by a release wire attached to the air-dropped devices. The wire has a lug on its free end which is inserted in a release solenoid mounted on the release rack. When the pilot does not want to deploy the speed brake, the release solenoid is not energized and the release wire will pull away from the rack with a minimum force. The release solenoid is energized for deployment of the speed brake and the release wire is pulled away from the device and retained by this solenoid when the air-dropped device is deployed.

The prior art system does not provide means to restrain the vibrations in the release wire induced by the high speed of the airplane. These vibrations, which may be as high as 50,000 c.p.s., cause the wire to break or pull away from the solenoid. As a consequence, the pilot's control of the speed brake was hampered and the speed brake was being deployed at the wrong time or was not being deployed at the right time.

Control of the deployment of the speed brake is critical when the air-dropped devices are bombs. If the speed brake is not deployed on low altitude bombing runs, the bomb will explode dangerously close to the airplane and may destroy the plane.

The release solenoid is designed to operate within a certain range of forces. The prior art had no effective way of controlling this range of forces. As an example, one type of solenoid, when energized, will not retain a release wire which exerts a pull of twelve pounds or more and when energized will retain a wire which exerts a pull of less than 100 pounds. The range of forces will vary with each arming solenoid. It is important that the pull exerted by the air-dropped device on the release wire does not exceed 100 pounds. If the pull exceeds this force, the release wire will pull away from the solenoid and the speed brake will not be deployed. Likewise, if the pull exerted by the air-dropped device on the wire is less than 12 pounds, the wire will be retained by the solenoid and the air brake will be released at a time when the pilot does not want it released.

The prior art, while not teaching a method of protecting release wires, does teach the use of a system for protecting the arming wire of a bomb from the vibration of the wind. The system utilizes a machine guide in which the arming wire is laid. This system, however, has a number of disadvantages. The guide used cannot be made from readily available materials. Furthermore, in the manufacture of the guide, careful attention must be paid to design tolerances. If the groove in the housing of the device is too large or too small, the wire will not be snugly held in place and vibrations will be induced in the wire by the high speed of the aircraft and will cause the wire to pull out of the groove. In addition, this system does not provide any means for varying the force of the pull of the release wire. The system is not, therefore, adaptable for use with solenoids having different pull-force ranges.

SUMMARY OF THE INVENTION

The present invention has a number of advantages over the prior art. It reduces the vibrations in the release wire so as to insure proper deployment of the speed brakes. The invention provides means for easily and accurately controlling the pull on the release wire. Furthermore, the system contemplated is easy and inexpensive to construct and may be made from stock items.

According to the invention, the air-dropped device is detachably mounted on the wing of an airplane. The speed brake is controlled by a wire inserted at one end in a solenoid on the airplane. The other end of the wire is reeved through a tube mounted on the air-dropped device and Fahnestock clips are placed on the end of the wire. The tube restricts the freedom of motion of the wire and reduces the vibrations in the wires. The amount of pull force on the wire can be varied by changing the number of clips.

The solenoid governs the deployment of the speed brake. When the solenoid is deenergized, a minimum force is required to pull the wire free of the airplane and the speed brake is not deployed. When the solenoid is energized, the pull force extended in the release wire by the air-dropped device and the solenoid causes the wire to be pulled free of the air-dropped device and the speed brake is deployed.

An object of this invention is to provide a system for decreasing the vibrations in the release wires of air-dropped devices equipped with speed brakes and for controlling the pull-force on the release wire.

Another object of this invention is to accomplish the above objective with a simple and economic system.

The specific nature of this invention, as well as other objectives and advantages thereof, will clearly appear from the following description and drawings.

DESCRIPTION OF PREFERRED EMBODIMENTS

Figure 1:
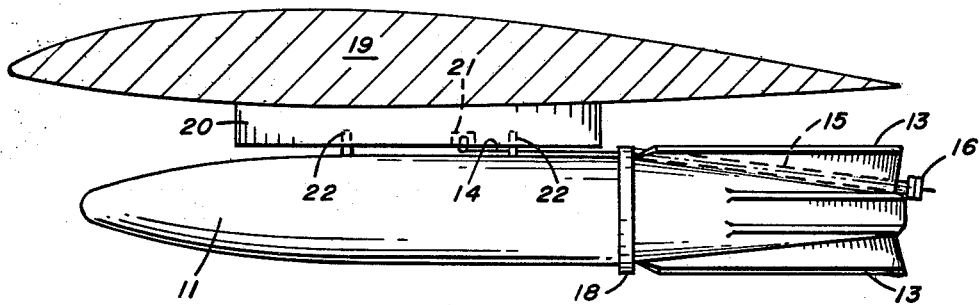
FIG. 1 is a side view of a bomb, embodying the invention, suspended from an airplane.

Referring to FIG. 1, a bomb 11 having a speed brake 13 attached to the rear of the charge 12 is shown. It shall be understood, however, that any air-dropped device such as a sonobuoy or flare, which has a speed brake, may utilize the restraining system of this invention.

Figure 3:
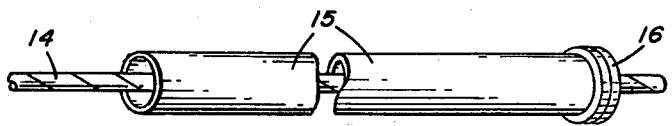
FIG. 3 shows the restraining means attached to the release wire.

The bomb 11 is mounted on rack 20 by lugs 22 and rack 20 is attached to an airplane wing 19. The deployment of the speed brake is controlled by release wire 14 which is attached at one end to arming solenoid 21. Wire 14 passes through lug 22 and through release band 18. The wire is then reeved through wire guide tube 15 and Fahnestock clips 16 are attached to it at the far end of the tube (FIG. 3). The Fahnestock clips grasp the wire in the vertical plane and the wire can be extracted from them by application of a pulling force to it.

Figure 2:
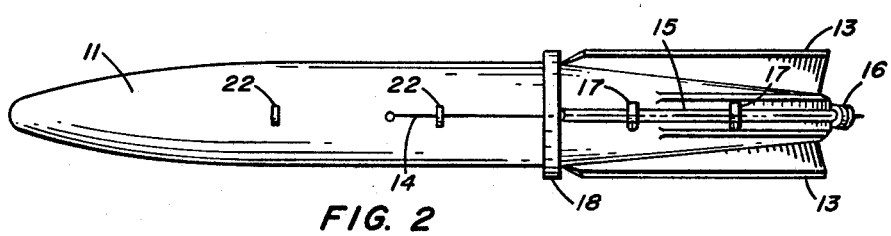
FIG. 2 is a top view of a bomb embodying the invention.

FIG. 2 is a top view of the bomb and shows the attachment of the wire guide tube to the speed brake by clamps 17. The clamps insure that the tube is retained by the bomb after it is deployed.

Any rigid commercially available tubing may be used for wire guide 15. Likewise, clips 16 and clamps 17 are both standard commercially available items.

In operation when the aircraft is moving at high speed and the air moving past the bomb tends to set up vibrations in the release wire. The wire guide tube restricts the freedom of motion of the wire. It serves to materially suppress the vibrations in the wire and keep them at a safe level.

Figure 4:
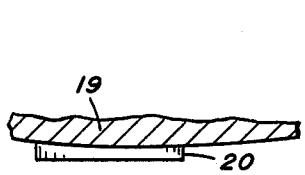
FIG. 4 shows the dropping of a bomb without the deployment of the speed brake.
Figure 4:
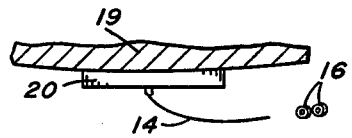
Figure 4:
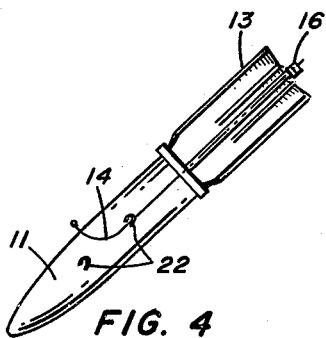

When the bomb is dropped without deployment of the speed brake, the arming solenoid 20 is not energized and an initial pull-force is necessary to extract the release wire from the solenoid. This force is normally in excess of 10 pounds and is applied by the Fahnestock clips to retain the wire with the bomb. This action can be seen in FIG. 4. The requirements of a 10 pound initial force insures that the wire will not be prematurely extracted by the vibrations set up in the wire.

When the bomb is dropped with the speed brake deployed, the solenoid is energized and as long as the pull force is not excessive the release wire is retained by the solenoid. If the force exerted by the release wire exceeds the specified limit for the solenoid, normally 100 pounds, the release wire will be pulled free of the solenoid and fall as in FIG. 4. The pulling force is limited by proper selection of the clips.

Figure 5:
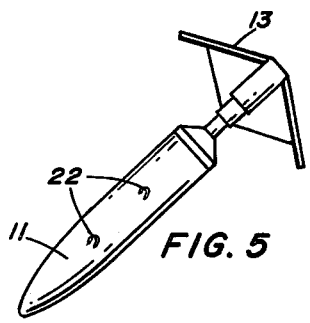
FIG. 5 shows the dropping of a bomb with the deployment of the speed brake.

As can be seen in FIG. 5, the arming solenoid holds the wire and the weight of the bomb exerts a force on the release wire. The clips are pulled against the tube and the wire is pulled free of the clips 16 which then fall away as the wire is drawn through the speed brake release band. The wire is retained by the arming solenoid and the release band opens allowing the speed brake to be deployed.

It is seen then that the wire guide tube and Fahnestock clips provide a novel restraining means which restricts the motion of the release wire and regulates the force applied to the arming solenoid.

Various modifications are contemplated and may obviously be resorted to by those skilled in the art without departing from the spirit and scope of the invention as hereinafter defined by the appended claims. Thus, for example, the wire guide tube may be welded to the bomb,

What is claimed is:

1. In combination with an air-dropped device having lugs for releasably attaching said air-dropped device to the outside of an aircraft, a speed brake and a release wire with one end being attached to said air-dropped device for controlling the deployment of said speed brake and with the other end adapted for releasable attachment to an aircraft, the improvement which comprises:
   a wire guide, through which said release wire is reeved, attached to said air-dropped device for restraining the freedom of motion of said release wire; and
   restraining means attached to said release wire at said other end for regulating the pull force applied by the release wire.

2. The combination of claim 1 wherein said restraining means comprises Fahnestock clips attached to said release wire.

3. The combination of claim 1 wherein said wire guide comprises an elongated circular tube having an inside diameter slightly larger than said release wire.

4. The combination of claim 3 wherein said restraining means comprises Fahnestock clips attached to said release wire.

References Cited

UNITED STATES PATENTS

| | | | |
|---|---|---|---|
| 2,377,587 | 6/1945 | Strong | 102—4 |
| 2,789,469 | 4/1957 | Fisher et al. | 89—1.5 |
| 2,942,545 | 6/1960 | Fogal et al. | 102—4 |
| 3,326,083 | 6/1967 | Johnson | 89—1.5 |

SAMUEL W. ENGLE, Primary Examiner

U.S. Cl. X.R.

102—4